United States Patent
Kawamura et al.

(10) Patent No.: US 8,665,926 B2
(45) Date of Patent: Mar. 4, 2014

(54) CLOSED-LOOP TRANSMISSION POWER CONTROL METHOD, BASE STATION APPARATUS AND TERMINAL

(75) Inventors: Teruo Kawamura, Kanagawa (JP); Yoshihisa Kishiyama, Kanagawa (JP); Kenichi Higuchi, Saitama (JP); Mamoru Sawahashi, Kanagawa (JP)

(73) Assignee: NTT Docomo, Inc., Tokyo (JP)

( * ) Notice: Subject to any disclaimer, the term of this patent is extended or adjusted under 35 U.S.C. 154(b) by 385 days.

(21) Appl. No.: 13/000,486

(22) PCT Filed: Jun. 26, 2009

(86) PCT No.: PCT/JP2009/061695
§ 371 (c)(1),
(2), (4) Date: Mar. 15, 2011

(87) PCT Pub. No.: WO2009/157534
PCT Pub. Date: Dec. 30, 2009

(65) Prior Publication Data
US 2011/0164659 A1    Jul. 7, 2011

(30) Foreign Application Priority Data

Jun. 26, 2008  (JP) .................................. 2008-167956

(51) Int. Cl.
*H04B 1/00*      (2006.01)
(52) U.S. Cl.
USPC ....... 375/133; 375/130; 375/132; 375/E1.033
(58) Field of Classification Search
USPC .......................................... 375/130.132, 133
See application file for complete search history.

(56) References Cited

U.S. PATENT DOCUMENTS

| 8,018,898 B2* | 9/2011 | Ofuji et al. ................... 370/329 |
| 8,135,429 B2* | 3/2012 | Kuroda et al. ................ 455/522 |
| 2009/0213802 A1* | 8/2009 | Miki et al. .................... 370/329 |

(Continued)

FOREIGN PATENT DOCUMENTS

| EP | 1734660 A1 * | 12/2006 | ............. 375/E1.036 |
| EP | 1 998 475 A1 | 12/2008 | |

(Continued)

OTHER PUBLICATIONS

3 GPP TSG RAN WG1 Meeting #50bis, R1-073934, "Uplink Reference Signal Sequence Allocation" Oct. 8-12, 2007, pp. 1-2.*

(Continued)

Primary Examiner — Daniel Washburn
Assistant Examiner — Berhanu Tadese
(74) Attorney, Agent, or Firm — Osha Liang LLP (57) ABSTRACT

In a closed-loop TPC for a channel using a wireless resource, to which frequency hopping is applied, a high quality reception is achieved for all RBs without applying another technique to each RB. This transmission power control method, in a mobile communications system that transmits signals by frequency hopping in a plurality of resource blocks, includes a transmission power control method that transmission-power controls a channel in a closed loop using a wireless resource to which frequency hopping is applied, measures a reception channel quality of received signals for each resource block (RB1 and RB2), and transmits a TPC command-bit via a downlink so that the reception quality that is independently measured at each resource block among the resource blocks is made equal to a target reception quality.

8 Claims, 8 Drawing Sheets

(56) References Cited

U.S. PATENT DOCUMENTS

| | | | |
|---|---|---|---|
| 2010/0103901 A1* | 4/2010 | Miki et al. | 370/330 |
| 2010/0232374 A1* | 9/2010 | Ofuji et al. | 370/329 |
| 2011/0090939 A1* | 4/2011 | Diener et al. | 375/136 |

FOREIGN PATENT DOCUMENTS

| | | |
|---|---|---|
| EP | 2 068 584 A1 | 6/2009 |
| JP | 2008-092375 A | 4/2008 |
| WO | 2007/111132 A1 | 10/2007 |
| WO | WO 2007111132 A1 * | 10/2007 |

OTHER PUBLICATIONS

3GPP TS 36.213 V8.2.0 (Mar. 2008), "Evolved Universal Terrestrial Radio Access (E-UTRA); Physical layer procedures," 30 pages.

International Search Report issued in PCT/JP2009/061695, mailed on Oct. 6, 2009, w/translation, 2 pages.

Notification of Reasons for Rejection for Japanese Application No. 2010-518068 dated Mar. 19, 2013, with English translation thereof (4 pages).

3GPP TSG RAN WG1 Meeting #50bis, R1-073934; "Uplink Reference Signal Sequence Allocation"; Toshiba; Shanghai, China, Oct. 8-12, 2007 (2 pages).

* cited by examiner

CLOSED-LOOP TRANSMISSION POWER CONTROL METHOD, BASE STATION APPARATUS AND TERMINAL

TECHNICAL FIELD

The present invention relates to a closed-loop transmission power control method, base station apparatus and terminal that is ideal for a fixed-rate channel such as a control channel.

BACKGROUND ART

In a wireless transmission system that performs wireless transmission based on a W-CDMA system, an uplink signal, that is transmitted from mobile stations (UE: User Equipment) located within the same cell, is multiplied with a user-specific scramble code, and the received signal of the uplink signal is non-orthogonal between the UEs located within the same cell. Therefore, high-speed transmission power control (TPC) has become essential in order to reduce the influence of multi-user interference (i.e., the near-far problem).

Whereas, in the LTE (Long Term Evolution) system specified in the 3GPP Release 8 (hereinafter referred as "Rel-8 LTE"), an SC-FDMA (Single-Carrier Frequency Division Multiple Access) system, which is effective for achieving a low peak-to-average power ratio (PAPR: Peak-To-Average Power Ratio) and increases coverage, employs an uplink transmission. The SC-FDMA system basically allocates a wireless resource configured from a predetermined frequency resource and a predetermined time resource to one UE via scheduling by the base station. Therefore, intra-cell orthogonality is achieved among a plurality of users at a frequency domain and time domain. Accordingly, from a viewpoint of suppressing intra-cell multi-user interference, TPC is not necessarily essential. However, in the Rel-8 LTE, since all of the cells are based on a one-cell frequency reuse, that uses the same frequency, a large amount of intra-cell interference from peripheral cells occurs, and the level of inference that cell-edge UEs receive from UEs of other cells is particularly high. Therefore, in order to compensate such peripheral cell interference and maintain a constant reception quality, it is necessary to apply TPC also to LTE.

In the Rel-8 LTE uplink, a 1) physical random access Channel (PRACH), a 2) physical uplink shared channel (PUSCH), and a 3) physical uplink control channel (PUCCH) are specified.

Only a low-speed TPC (open-loop TPC), which compensates for distance attenuation and shadowing variations, is applied to the PRACH.

PUSCH is a physical channel for transmitting user data. The adaptive modulation and channel coding (AMC) in accordance with the reception channel state of the UE and an adaptive TPC are applied to the PUSCH. In this case, compensation of pass loss and shadowing variations are dealt with by using an appropriate TPC (open-loop TPC), and instantaneous fading variations are dealt with by an adaptive rate control via the AMC.

On the other hand, PUCCH is a physical channel for transmitting control information (typically downlink reception channel quality (CQI: Channel Quality Indicator) information and downlink acknowledgement (ACK)/negative ACK (NACK), etc.). Since the transmission bit number of such control information is predetermined, the transmission rate thereof is fixed, and hence does not require an adaptive rate control via the AMC in accordance with the reception channel quality. Rather, it is important for the information transmitted by the PUCCH to maintain a constant reception quality due to the essential requirement of feedback for the AMC or for repeating that is applied in the downlink data channel. Therefore, with respect to the PUCCH, since it is necessary to compensate the reception level, including pass loss, shadowing variations, and instantaneous fading variations, a closed-loop TPC should be applied in addition to the open-loop TPC.

Figure 2:
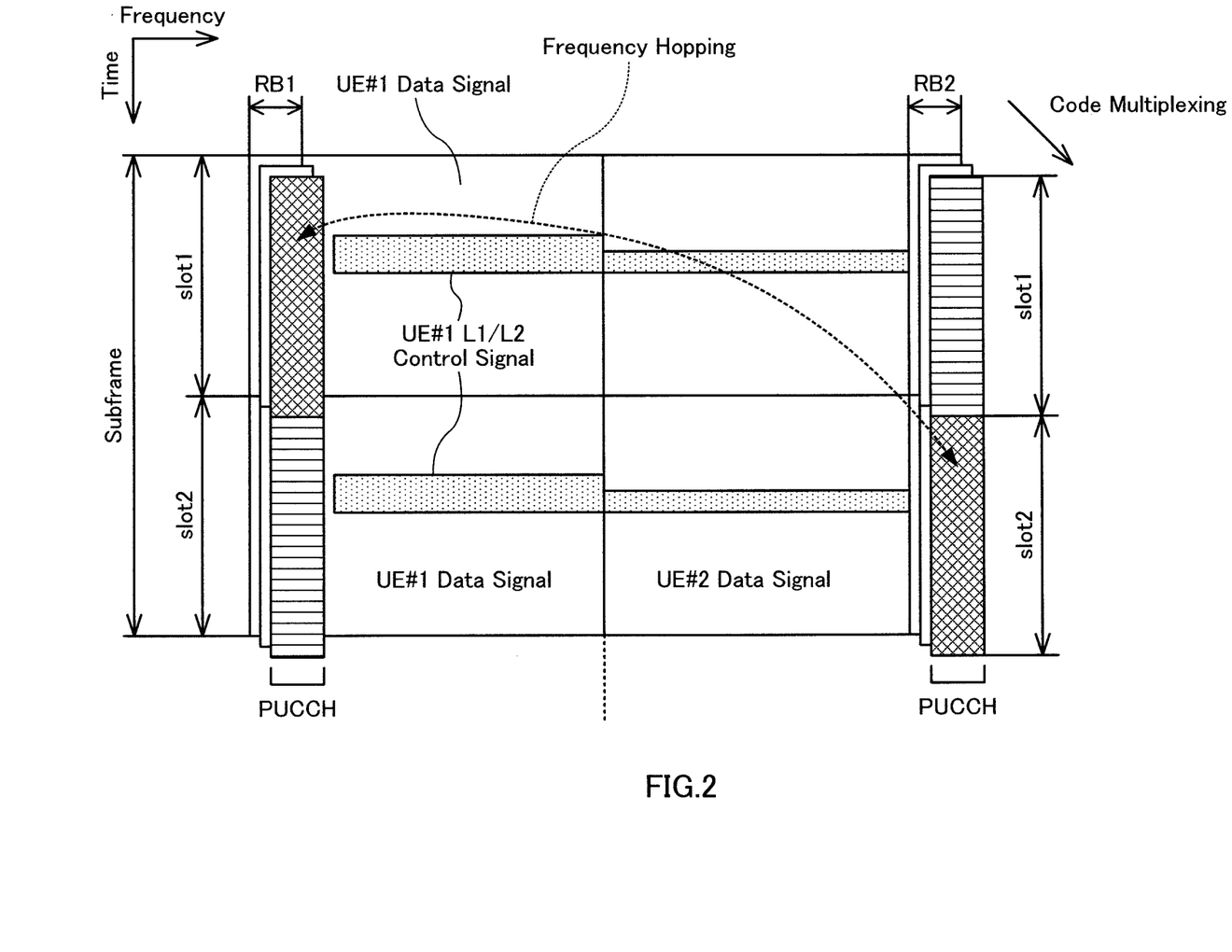
FIG. 2 is a configuration diagram of a PUCCH in the Rel-8 LTE uplink.

FIG. 2 is a configuration diagram of the PUCCH in the Rel-8 LTE uplink.

In order for the PUCCH to be both always transmittable and have a low overhead, a narrow bandwidth (180 kHz) wireless resource is employed. Furthermore, a 1 msec subframe is configured from two 0.5 msec slots. In the case of using a narrow transmission bandwidth, generally the frequency diversity gain is reduced. However, by utilizing the two slots within one subframe and applying frequency hopping between the bandwidths at each end of the transmission spectrum, a large frequency diversity effect can be obtained. Transmission bandwidths RB1 and RB2 are allotted in the bandwidths at each end of the frequency hopped transmission spectrum, frequency hopping is executed between slot 1 of RB1 and slot 2 of RB2 for UE1, and frequency hopping is executed frequency hopped between slot 1 of RB2 and slot 2 of RB1 for UE2. The transmission bandwidths RB1 and RB2 can also be referred to as resource blocks (RB). Furthermore, a plurality of mobile stations, to which frequency hopping is applied, that use the same wireless resource are orthogonalized by code division multiplexing.

Figure 5:
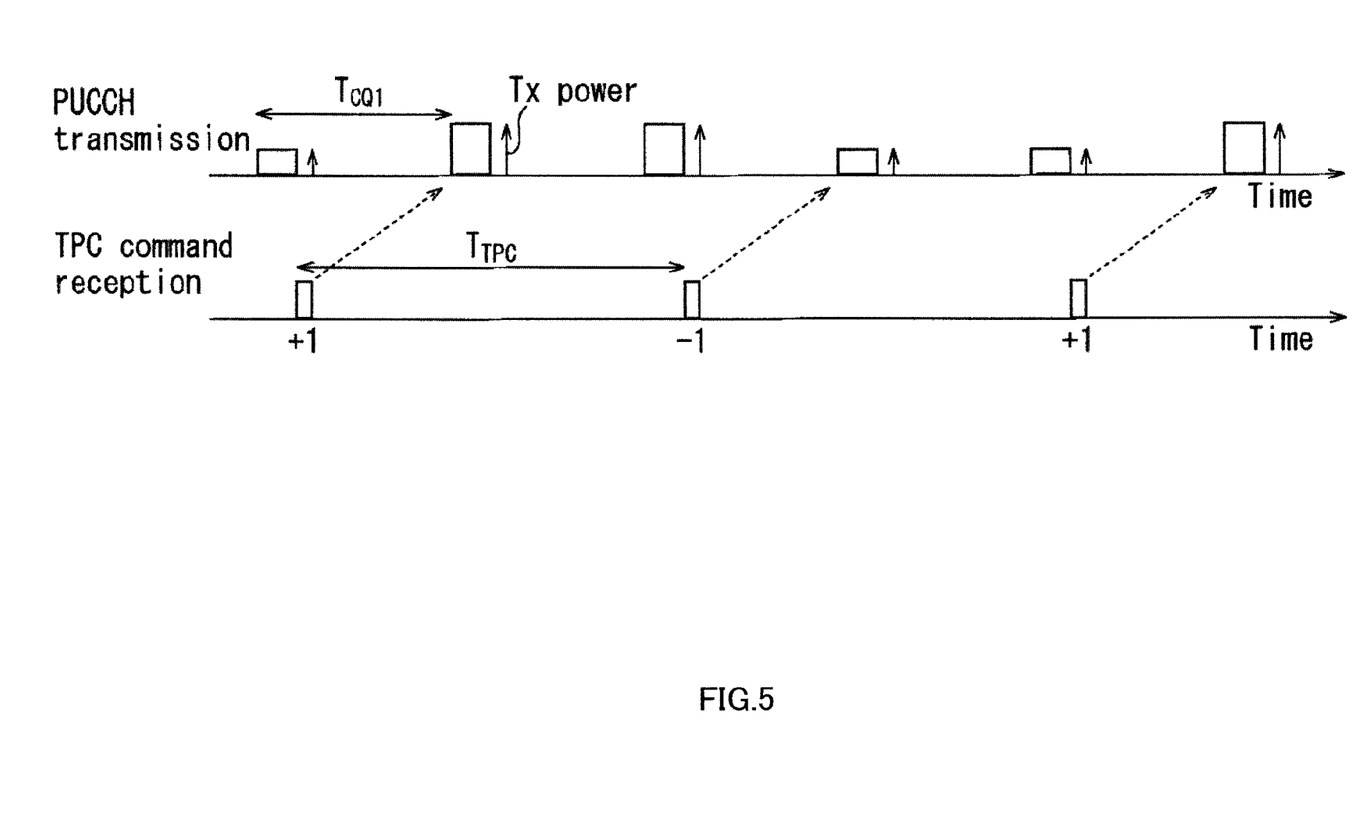
FIG. 5 is a conceptual diagram of the closed-loop TPC with respect to the PUCCH specified in the Rel-8 LTE.

FIG. 5 is a conceptual diagram of the closed-loop TPC with respect to the PUCCH specified in the Rel-8 LTE. As shown in FIG. 5, in the Rel-8 LTE uplink, a mode that periodically (TCQI) transmits the CQI information in the PUCCH. In this case, the uplink reception channel quality (SINR) is measured in the base station using a reference signal (RS), for estimating the channel, that is sent by the PUCCH. The reception SINR and the target reception level are compared, and a TPC command bit is generated in order to control the transmission power so as to have a constant reception quality. For example, the base station generates a TPC command bit at a given frequency (TTPC) and transmits it to a mobile station. At the mobile station, the transmission power of the PUCCH is adjusted in accordance with the received TPC command bit. The uplink closed-loop TPC can be achieved in this manner.

Figure 6:
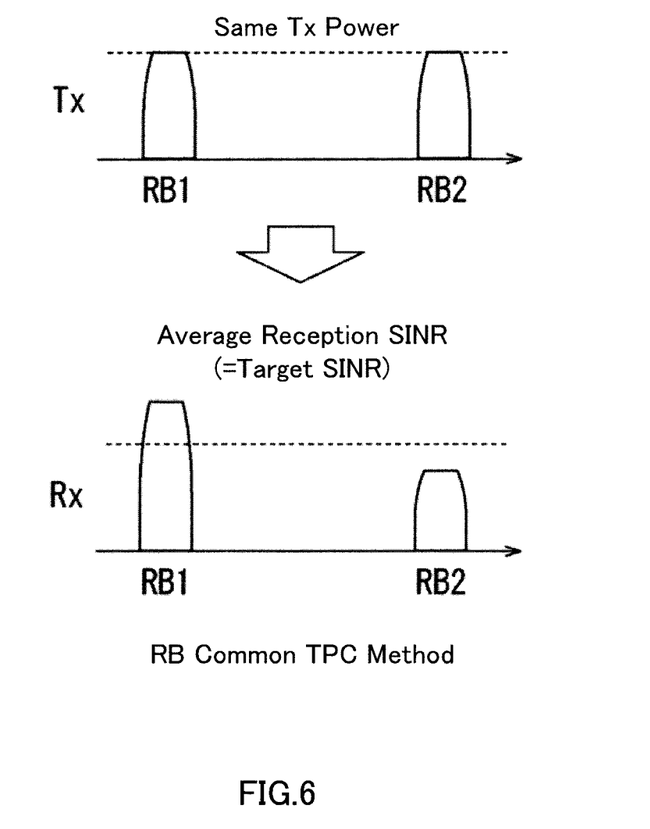
FIG. 6 is a conceptual diagram of an RB common TPC method with respect to the PUCCH in the Rel-8 LTE.

FIG. 6 is a conceptual diagram of a TPC method (referred to in this specification as "RB common TPC method") with respect to the PUCCH in the Rel-8 LTE. In the RB common TPC method, the reception SINR for each of the frequency hopped RB1 and RB2 of the PUCCH is measured, and the average reception SINR is obtained by averaging the measured reception SINR between the RB1 and the RB2. A TPC command bit is sent to the UE so that the average reception SINR is made to equal the target SINR value, and closed-loop control is performed.

The RB common TPC method is a method for performing common power control between the RBs with respect to the UE in order to make the average reception SINR, of the two RB1 and RB2 that used for frequency hopping, become equal with the target reception SINR value. As shown in FIG. 6, at the transmission end (Tx), the RB1 and RB2 are adjusted to have a common (same) power, since frequency selective fading occurs in the channel propagation path between the mobile station and the base station, the reception SINRs at the base station have differing reception levels between the RB1 and the RB2. In the example shown in FIG. 6 indicates a state in which the average reception SINR of the RB1 and the RB2 is equal to the target SINR; however, the RB1 is received at an excessive quality that exceeds the target value, whereas, the RB2 is received at a quality that is under the target value.

PRIOR ART DOCUMENTS

Non-Patent Documents

Non-Patent Document 1
3GPP, TS 36.213, V8.2.0, "Evolved Universal Terrestrial Radio Access (E-UTRA); Physical layer procedures"

SUMMARY OF INVENTION

Technical Problem

However, in the above-described RB common TPC method, since a common power control between RBs is performed in order make the average reception SINR equal to the target SINR value, sometimes a high quality reception per RB unit is not always necessarily achieved.

Furthermore, even in the case where the average reception SINR and the target SINR value are equal, it is essential to remedy the large level difference in the reception quality, that remains upon frequency hopping between RBs, using another technique (frequency hopping or channel coding before and after frequency hopping).

The present invention has been devised in view of the above-mentioned matters. It is an objective of the present invention to provide a closed-loop transmission power control method that can achieve a constant reception quality for all RBs without applying another technique to each RB during the closed-loop TPC, and to provide a base station apparatus and a terminal.

Solution to Problem

The transmission power control method of the present invention is characterized by receiving a hopped signal of one of a plurality of frequency bands from a terminal per a predetermined unit of time; individually measuring the quality of the signal received from the terminal at the unit of time per frequency band at which the signal is hopped; individually generating, at each the frequency band, transmission power control information that indicates the amount of uplink transmission power that should vary in the terminal in accordance with a difference in the quality of the measurement signal and the target quality per frequency band, respectively; and transmitting the transmission power control information, which is individually generated per frequency band, to the terminal.

Furthermore, the transmission power control method of the present invention is characterized by receiving a hopped signal of one of a plurality of frequency bands from a terminal per a predetermined unit of time; measuring the quality of the received signal per unit of time; wherein in the case where the measurement signal that is the object of measurement and an adjacent signal that is timewise either before or after the measurement signal are hopped between different frequency bands, the transmission power control information that indicates the amount of uplink transmission power that should vary in the terminal is generated by the difference in the quality between the measurement signal only and the target quality; and transmitting the transmission power control information, which is individually generated per frequency band, to the terminal.

According to this configuration, in the case where the measurement signal that is the object of measurement and an adjacent signal that is timewise either before or after the measurement signal are hopped between different frequency bands, since the transmission power control information that indicates the amount of uplink transmission power that should vary in the terminal is generated by the difference between the quality of the measurement signal only and the target quality, the quality of each signal can be precisely made equal to the target quality compared to the case where the signal quality of different frequency bands are averaged out, so that a high quality reception can be achieved.

Furthermore, the transmission power control method of the present invention is characterized by, in the case where the measurement signal that is the object of measurement and an adjacent signal that is timewise either before or after the measurement signal are hopped within the same frequency band, the transmission power control information that indicates the amount of uplink transmission power that should vary in the terminal being generated by the difference between the time average of the measured quality and the target quality; and in the case where the measurement signal that is the object of measurement and an adjacent signal that is timewise either before or after the measurement signal are hopped between different frequency bands, the transmission power control information being generated based on only using the measurement signal.

According to this configuration, a high quality reception can be achieved both in the case where the measurement signal and an adjacent signal that is timewise either before or after the measurement signal are hopped within the same frequency band and in the case where the measurement signal and an adjacent signal that is timewise either before or after the measurement signal are hopped between different frequency bands.

Effects of Invention

According to the present invention, a high quality reception for all RBs can be achieved without applying another technique to each RB during the closed-loop TPC.

BEST MODE FOR CARRYING OUT THE INVENTION

The following is a detailed description of the embodiments of the present invention with reference to the accompanied drawings.

The transmission power control method pertaining to the illustrated embodiment will be described with reference to FIG. 1. An uplink specified by the Rel-8 LTE will be described using the PUCCH shown in FIG. 2 by way of example of a channel that is closed-loop transmission power controlled. However, the present invention is not limited to the uplink fixed-rate channel to which frequency hopping is applied; a channel other the PUCCH may be applied.

The Rel-8 LTE uplink PUCCH is a channel for transmitting control information (typically CQI, ACK or NACK). One subframe is configured of two slots 1 and 2. Frequency hopping is applied using the bandwidths (RB1 and RB2) at both ends of the transmission spectrum between slot 1 and slot 2. Furthermore, at a base station, a reception SINR is measured using the RB within the PUCCH that periodically transmits CQI information. The reception SINR and a target SINR are compared, and a TPC command bit is generated for adjusting the transmission power of the PUCCH in accordance with the comparison result. The generated PUCCH transmission power TPC command bit is fed back from the opposing link to the mobile station device. Furthermore, in the mobile station device, the PUCCH transmission power is controlled based on the TPC command bit received through a downlink. Accordingly, a closed-loop TPC for a PUCCH that transmits a CQI is achieved.

In the present embodiment, in regard to the two RBs (RB1 and RB2) used in the frequency hopping of the PUCCH transmission signal, reception SINRs are individually calculated for each RB, and appropriate TPC command bits are generated in order to make the independent reception SINRs equal to the target SINR value for the RB1 and RB2, respectively. Accordingly, the individually obtained TPC command bits in regard to the RB1 and the RB2 are fed back through the downlink (hereinafter referred to as the "RB independent TPC method"). In other words, in the RB independent TPC method, the reception SINRs of the RB1 and the RB2, which have difference frequency bands, are not averaged out, but rather a TPC command bit (RB1) for making the reception SINR of the RB1 equal to the target SINR and a TPC command bit (RB2) for making the reception SINR of the RB2 equal to the target SINR are respectively generated and sent to the UE. The transmission power of the RB1 and the RB2 that correspond to the TPC command bits (RB1 and RB2) assigned for each RB is controlled at the UE.

Furthermore, in the above-described present invention, in the case where a hopped signal from either of a plurality of frequency bands is received per a predetermined unit of time, the reception SINR is measured as a signal quality measurement of the received signal at each unit of time wherein the measurement signal that is the object of measurement and an adjacent signal that is timewise either before or after the measurement signal are hopped between the different frequency bands, the measurement signal can solely be used as a basis for generating the TPC command bits.

Furthermore, in the above-described present invention, in the case where a hopped signal from either of a plurality of frequency bands is received at each predetermined unit of time, the reception SINR is measured as a signal quality measurement of the received signal at each unit of time wherein the measurement signal that is the object of measurement and an adjacent signal that is timewise either before or after the measurement signal are hopped within the same frequency bands, an arrangement can be included in which the transmission power control information indicated by the amount of uplink transmission power that should be varied is generated at the terminal via the difference in the time average of the measured quality and the target quality. In other words, frequency hopping is not applied per slot unit, rather, frequency hopping can be applied per subframe unit. Specifically, in an arrangement in which CQI information is sent at a predetermined number of subframe intervals, in one subframe, a control signal is transmitted using two adjacent slots 1 and 2 within the RB1, and is frequency hopped so that subsequently in another subframe that sends CQI information, a control signal is transmitted using two adjacent slots 1 and 2 in the RB2. In this case, since the measurement signal (slot 1) that is the object of measurement and an adjacent signal (slot 2) that is timewise either before or after the measurement signal are hopped within the same frequency band (e.g., R1), in regard to the frequency band (R1), the transmission power control information indicated by the amount of uplink transmission power that should be varied is determined according to the difference between the time average of the measured quality (slot 1+slot 2) and the target quality. Also in regard to the other frequency band (R2), the transmission power control information is determined in the same manner.

Figure 1:
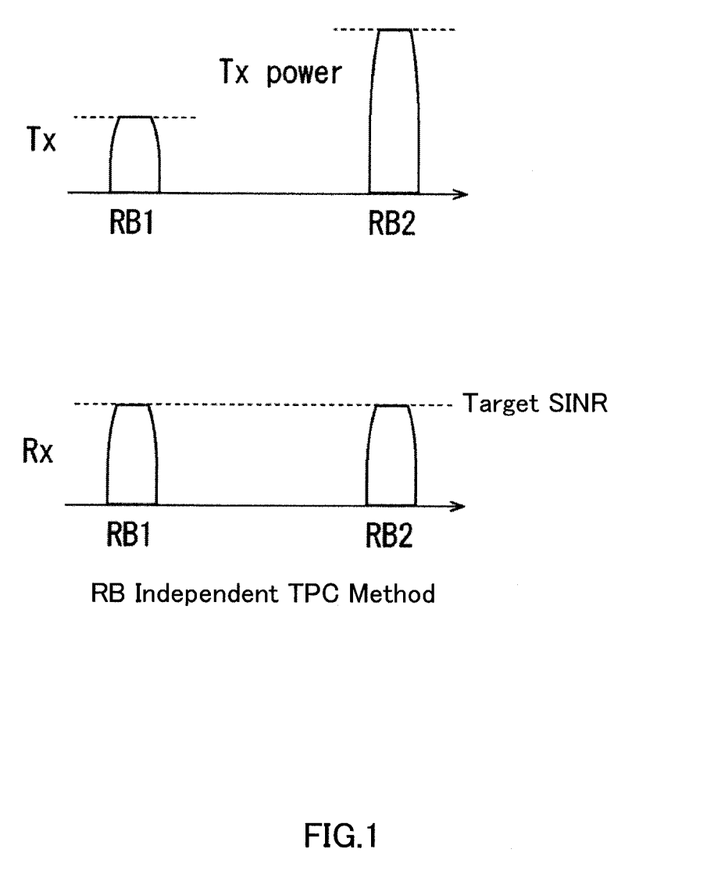
FIG. 1 is a conceptual diagram of a transmission power control method in a fixed-rate channel, according to an embodiment.

Accordingly, as shown in FIG. 1, if the state of the propagation channels of the RB1 and the RB2 are different, with respect to the UE at the transmission end (Tx), TPC commands assigned with different transmission powers between the RB1 and the RB2 are assigned, however, with respect to the base station at the reception end (Rx), both of the reception SINRs of the RB1 and the RB2 ultimately become equal to the target SINR.

Hence, by applying the above-described RB independent TPC method to the PUCCH closed-loop TPC, since each reception SINR of the RB1 and the RB2 can be more accurately made equal to the target SINR value compared to the RB common TPC method, a high reception quality can be achieved in both of the RB1 and the RB2. As a result, the transmitted control signal in the PUCCH in which the SINRs have been accurately made equal with the target SINR value can also be received in high quality.

An embodiment of a base station apparatus and a mobile station device (UE) to which the present invention is applied will be hereinafter discussed.

Figure 3:
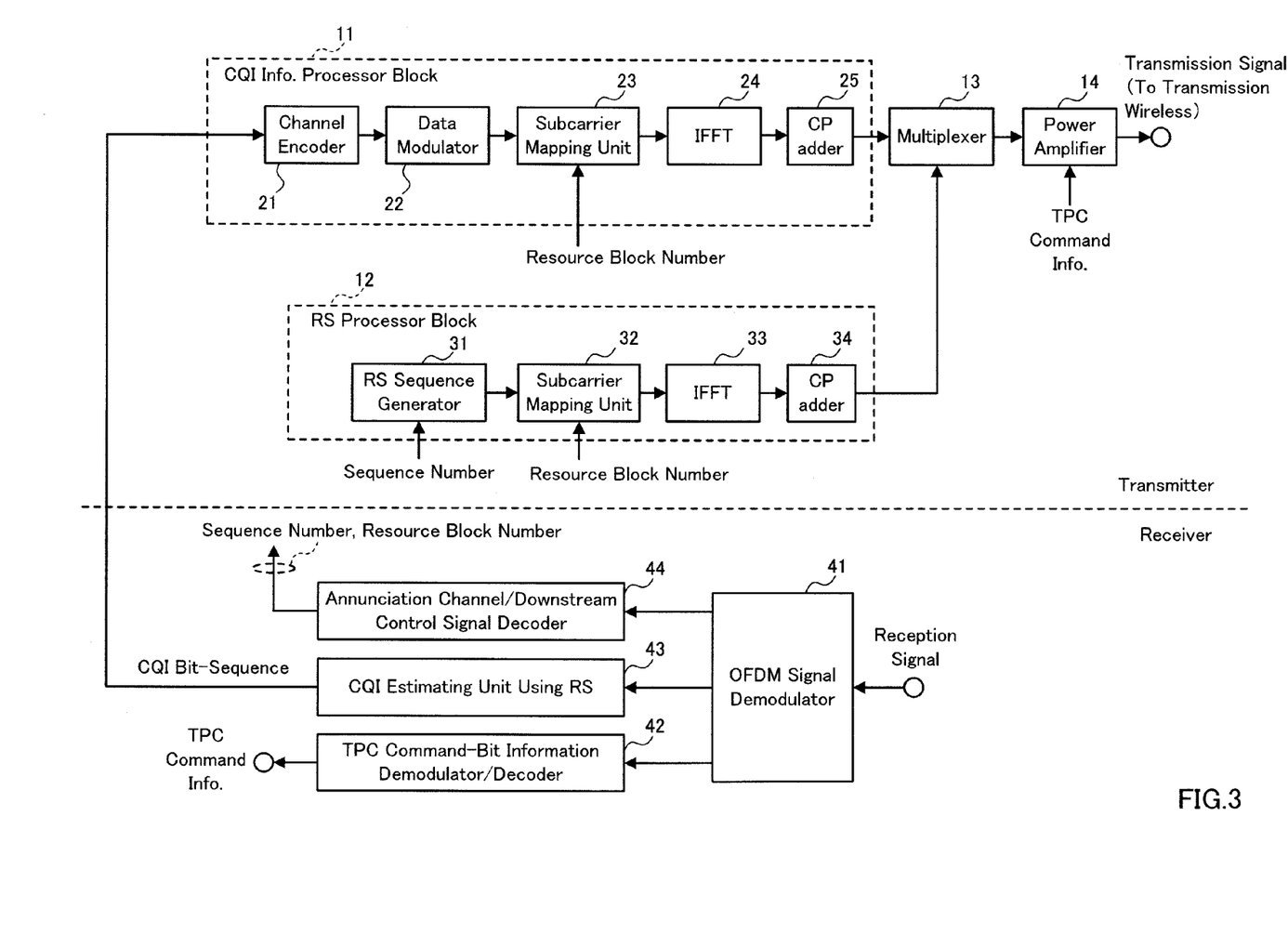
FIG. 3 is a functional block diagram of a transmitter and a receiver of a mobile station device (UE).
Figure 4:
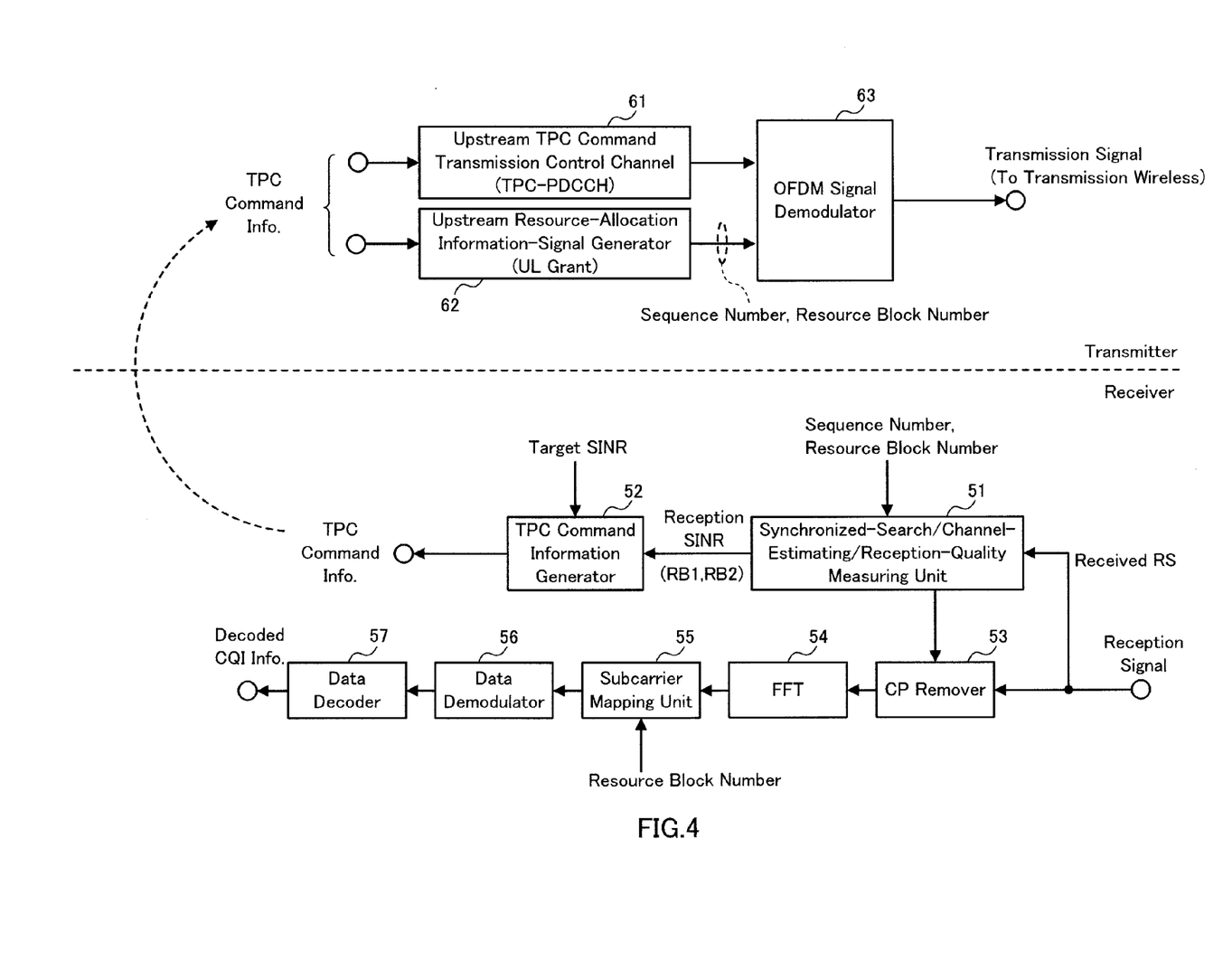
FIG. 4 is a functional block diagram of a transmitter and a receiver of a base station apparatus.

FIG. 3 is a functional block diagram of a transmitter and a receiver of the mobile station device (UE), and FIG. 4 is a functional block diagram of a transmitter and a receiver of the base station apparatus.

The transmitter of the mobile station device (UE) is provided with a processing block 11 for sending CQI information that constitutes one type of control information, a processor block 12 for sending an RS, a multiplexer 13 which multiplexes the CQI information with the RS, and a power amplifier 14 that transmission power controls the multiplexed signal for each of the RB1 and RB2 used in the frequency hopping.

In the processor block 11, the CQI information (CQI bit sequence) that constitutes reception quality information estimated from the RS received by the downlink in the receiver is channel encoded by a channel encoder 21. The channel encoded CQI information is modulated by a data modulator 22 using a predetermined modulation method, and thereupon is supplied to a subcarrier mapping unit 23. In the subcarrier mapping unit 23, the CQI information is frequency hopped between the RB1 and the RB2 per slot unit based on the resource block number. For example, the CQI information is hopped between slot 1 of RB1 and slot 2 of RB2. At this instance, either mapping is carried out in alternately different frequency bands for each slot of a plurality of slots sequentially, or mapping is carried out in alternately different frequency bands in one unit of a plurality of continuous slots (e.g., a subframe unit). The output signal from the subcarrier mapping unit 23 is inverse fast Fourier transformed by an IFFT unit 24 to a time-axis waveform signal, a guard interval is added by a CP adder 25, and thereupon is output to the multiplexer 13.

A resource block number and a sequence number that are decoded from the control signal received in the receiver via the downlink are collected in the RS processor block 12. An RS series generator 31 generates an RS based on the sequence number. In a subcarrier mapping unit 32, the RS is frequency hopped between the RB1 and the RB2 per slot unit based on the resource block number. The output signal from the subcarrier mapping unit 32 is inverse fast Fourier transformed by an IFFT unit 33 to a time-axis waveform signal, a guard interval is added by a CP adder 34, and thereupon is output to the multiplexer 13.

The CQI information that is output from the CQI information processor block 11 and the RS that is output from the RS processor block 12 is multiplexed in the multiplexer 13. The multiplexed signal of the CQI information and the RS that is output from the multiplexer 13 is independently transmission power controlled via the RB1 and RB2 at the power amplifier 14.

Therefore, TPC commands with respect to each of the RB1 and the RB2 that map the slot 1 and the slot 2 in the subcarrier mapping unit 23 and the subcarrier mapping unit 32 are included in the TPC command information that is decoded in the receiver. The power amplifier 14 amplifies the signal by the transmission power independently assigned by each TPC command of the RB1 and the RB2. Accordingly, the transmission signals in which the transmission power thereof are independently controlled at each of the RB1 and the RB2 are wirelessly transmitted from a transmission wireless.

On the other hand, at the base station apparatus, the RS is divided from the multiplexed reception signal of the CQI information and the RS. The divided RS is used for synchronized searching in the synchronized-search/channel-estimating/reception-quality measuring unit 51, and furthermore, channel estimation is carried out by comparing the received RS and the given signal (RS transmission replica). Furthermore, based on the resource block number, the reception SINR (RB1) and the reception SINR (RB2) of RB1 and RB2, respectively, are measured. A TPC command information generator 52 receives the reception SINRs of the RB1 and the RB2, respectively, and compares the reception SINRs with the target SINR value. Thereafter, based on the compared result of the target SINR value with the RB1 reception SINR (RB1), a TPC command bit (RB1) with respect to the RB1 is generated in order to make the reception SINR (RB1) equal with the target SINR value. Furthermore, based on the compared result of the target SINR value with the RB2 reception SINR (RB2), a TPC command bit (RB2) with respect to the RB2 is generated in order to make the reception SINR (RB2) equal with the target SINR value. In other words, at this time, in the case where the measurement signal that is the object of measurement (e.g., slot 1) and an adjacent signal that is timewise either before or after the measurement signal (e.g., slot 2) are hopped between the different frequency bands, the measurement signal (slot 1) can solely be used as a basis for generating the TPC command bits. Furthermore, in other words, in the case where the measurement signal that is the object of measurement (e.g., slot 1) and an adjacent signal that is timewise either before or after the measurement signal (e.g., slot 2) are hopped between the different frequency bands, the TPC command bit indicated by the amount of uplink transmission power that should be varied at the mobile station is determined according to the difference between the reception SINR of the measurement signal only (slot 1) and the target SINR.

Hence, in the RB independent TPC method, the TPC command bits that make the reception SINRs of each RB that is used in the frequency hopping equal to the target SINR are independently generated for each RB.

Furthermore, the guard interval is removed by the CP remover 53 based on the timing detected by the synchronized-search/channel-estimating/reception-quality measuring unit 51, and upon fast Fourier transforming by an FFT unit 54, the control information (CQI information) that is mapped in the RB1 and the RB2, respectively, is demapped by a subcarrier demapping unit 55 based on the resource block number. The demapped CQI information is demodulated by a data demodulator 56 and is further decoded by a data decoder 57.

On the other hand, upon the above process, the TPC command (RB1) and the TPC command (RB2) that are independently generated for each RB are converted into OFDM signals by an OFDM signal generator 63 using an uplink TPC command transmission control channel (TPC-PDCCH) 61, and thereupon is transmitted to a mobile station device (UE) via the downlink. Furthermore, uplink resource allocation information is generated in an uplink resource-allocation information signal generator (UL grant) 62, and by including TPC command information in the uplink resource allocation information signal, transmission can be carried out using both the TPC-PDCCH and the UL grant.

In the mobile station device, reception signals received from the base station apparatus are modulated by an OFDM demodulator 41, the TPC command-bit information is input to a TPC command-bit information demodulator/decoder 42, the RS is output to a CQI estimating unit 43, and an annunciation channel and a downstream control signal are output to a decoder 44.

The annunciation channel and downstream control signal decoder 44 decodes the annunciation channel or the downstream control signal of the received signal, and obtains a sequence number and a resource block number. The sequence number is given to the RS series generator 31 and the resource number is given to the subcarrier mapping units 23 and 32. In the TPC command-bit information demodulator/decoder 42, the TPC command (RB1) and the TPC command (RB2) that are independently generated for each RB via the TPC-PDCCH or the UL grant are demodulated and decoded, and given to the power amplifier 14 as TPC command information. As described above, the power amplifier 14 controls the transmission power based on the TPC commands that are independently generated for each RB. Hence, the closed-loop TPC is achieved.

Note that although the case in which frequency hopping is applied to the PUCCH has been described, the above described embodiment may also be applied to the case where frequency hopping is not applied. In FIG. 2, the PUCCH is allocated to the RB1 for transmission between the UE1, and the PUCCH is allocated to the RB2 for transmission between the UE2. With regard to UE1, control information is transmitted using the slot 1 and the slot 2 of the RB. In this instance, the TPC command-bit does not average the reception SINRs of the RB1 and the RB2, rather, the TPC command-bit uses an in-phase average of one subframe (slot 2) of the RB1. A TPC command-bit that makes the reception SINR in which the one subframe (slot 2) per RB has been in-phase averaged equal to the target SINR is generated for each RB, and closed-loop TPCs that are independent between the RBs are carried out.

Hence, by using an in-phase average, in the time domain, of two slots that constitute one subframe, the channel estimation accuracy and the accuracy in the measurement of the reception SINR used in the closed-loop TPC can be improved, so that a high quality reception of comprehensive PUCCH information and a highly accurate closed-loop TPC can be achieved.

Figure 7:
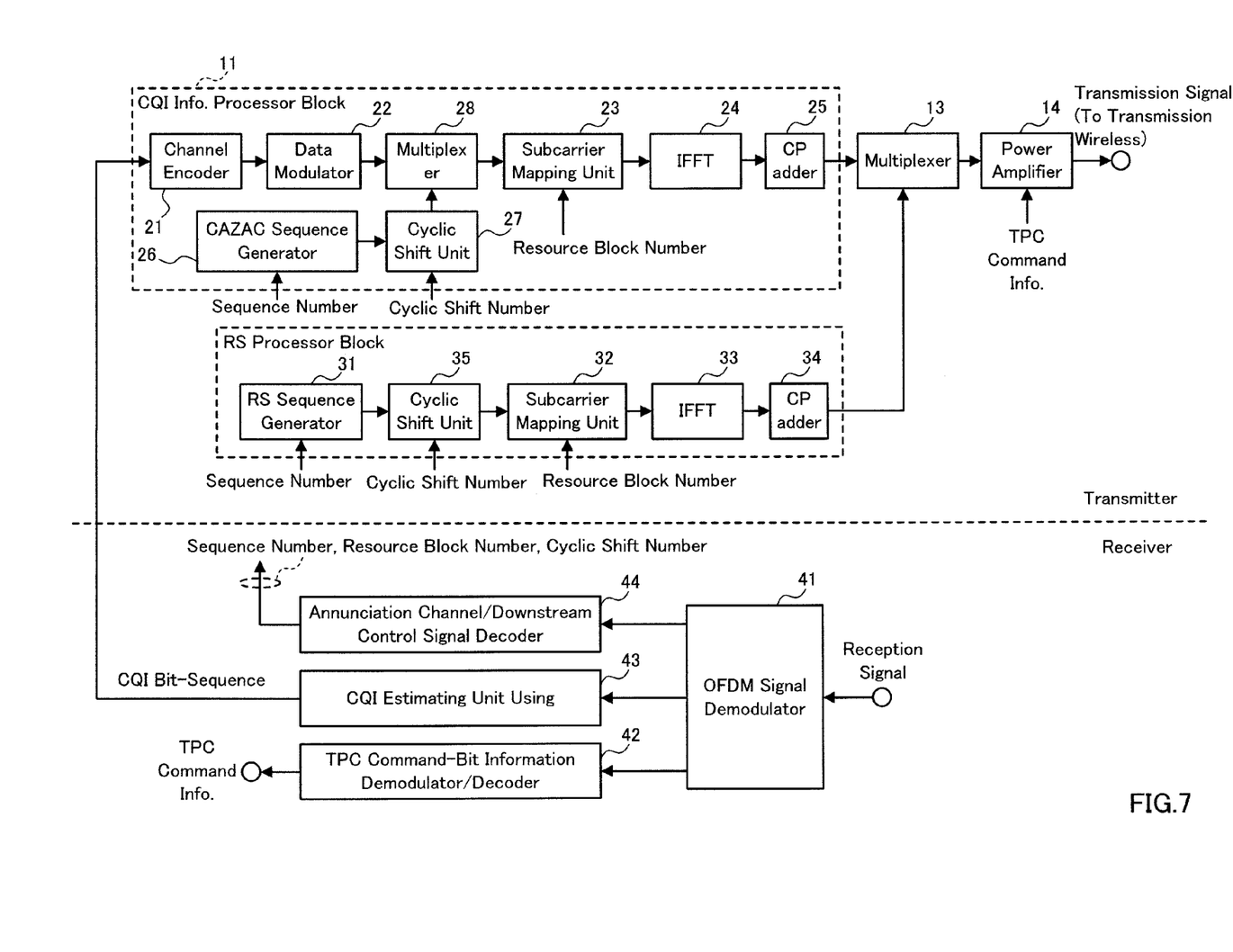
FIG. 7 is a functional block diagram of a mobile station device in which a processing block is included for orthogonalization between intra-cell users.
Figure 8:
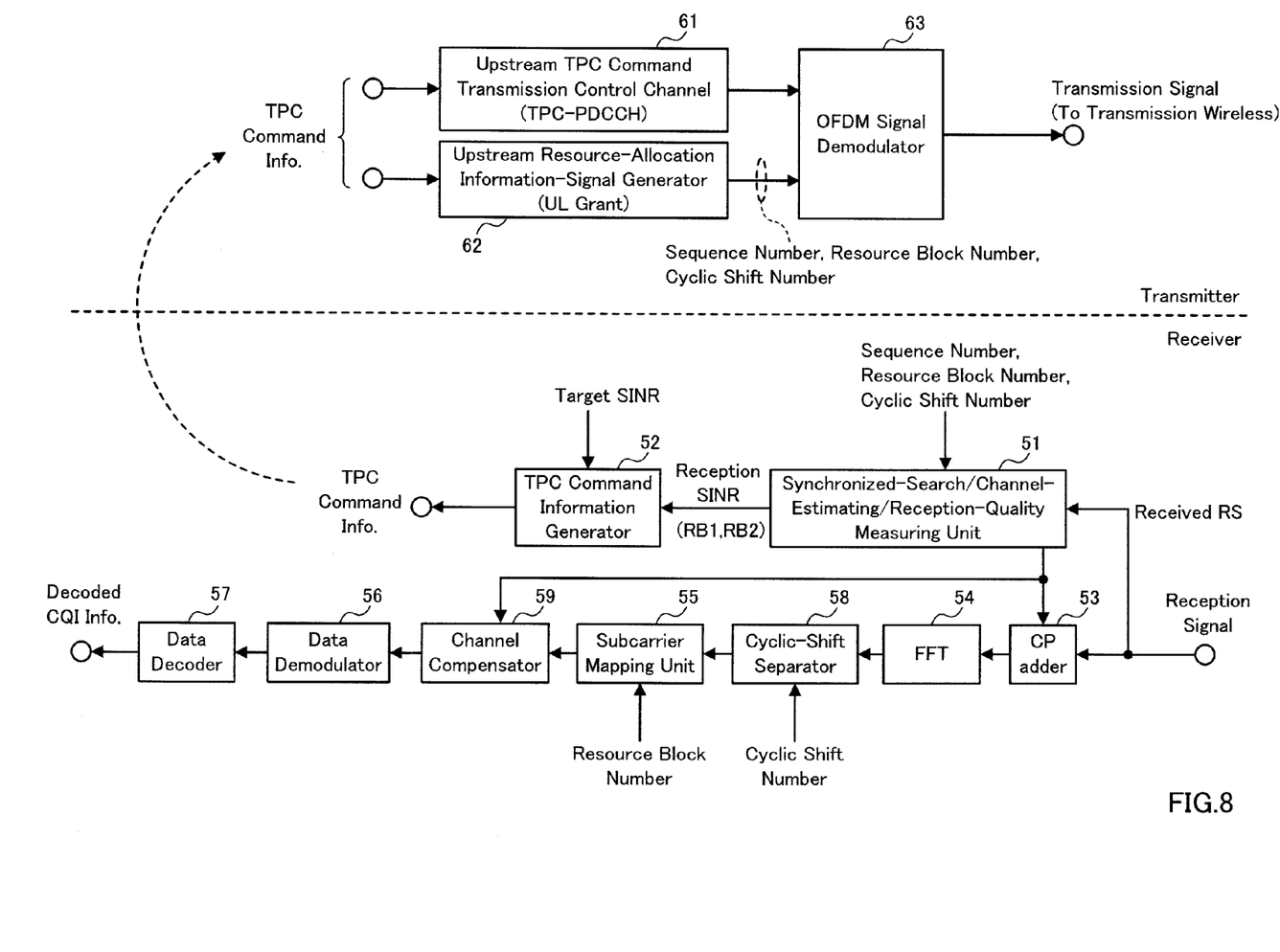
FIG. 8 is a functional block diagram of a base station apparatus that corresponds to the mobile station device shown in FIG. 7.

FIG. 7 shows a functional block diagram of a mobile station device in which a processing block is included for orthogonalization between intra-cell users. FIG. 8 is a functional block diagram of a base station apparatus that corresponds to the mobile station device shown in FIG. 7.

As shown in FIG. 8, the uplink resource-allocation information-signal generator 62 in the transmitter of the base station apparatus generates a sequence number that indicates the start location of a CAZAC (Constant Amplitude Zero Auto-Correlation) sequence, a cyclic shift number indicating a shift amount, and a resource block number indicating a wireless resource that is allocated in the mobile station device. The base station apparatus allocates (i.e., code-multiplexes) a different cyclic shift per mobile station device for the same CAZAC sequence in order to orthogonalize and multiplex the uplink control signals for the mobile station devices that exist in the same cell being controlled. Accordingly, the base station apparatus generates a sequence number that is common between users and a cyclic shift number that is different for each user, with respect to the mobile station devices that exist in the same cell being controlled, and notifies each user via the downlink. Note that a Zadoff-Chu sequence may be used as a CAZAC sequence.

As shown in FIG. 7, the annunciation channel/downstream control signal decoder 44 in the receiver of the mobile station device decodes the control signal, which includes the sequence number, the resource block number, and the cyclic shift number, from the downlink OFDM demodulated signal.

The transmitter of the mobile station device is provided with a CAZAC sequence generator 26 that generates a CAZAC sequence signal based on the sequence number notified by the base station apparatus; a cyclic shift unit 27 that shifts the CAZAC sequence signal, generated by the CAZAC sequence generator 26, in accordance with the cyclic shift number; and a multiplexer 28 that multiplies the CAZAC sequence number, shifted by the cyclic shift unit 27, with the CQI information. Accordingly, the CQI information that this mobile station device transmits via the uplink is encoded into an orthogonalized signal, with respect other mobile station devices.

Moreover, the transmitter of the mobile station device is provided with a cyclic shift unit 35 that shifts the RS sequence signal that is generated by the RS sequence generator 31 according to the cyclic shift number. Accordingly, the RS that this mobile station device transmits via the uplink is encoded into an orthogonalized signal, with respect other mobile station devices.

Accordingly, in the mobile station device, the control signal (CQI and RS) is orthogonalized and multiplexed with respect to other users, and thereafter, is frequency hopped via the downlink and transmitted.

The receiver of the base station apparatus inputs a signal (CQI information) that is returned to the frequency domain via the FFT unit 54, and is provided with a cyclic-shift separator 58 that separates the CQI information based on the cyclic shift number from this input signal. Since the cyclic shift number allocates a different number per user, by separating the signal using the cyclic shift number allocated to the user, the CQI information received from each user can be extracted.

Moreover, the receiver of the base station is provided with a channel compensator 59 that returns (compensates) the channel variation occurring between the mobile station device and the base station apparatus based on a channel estimation value that is estimated using the RS. After subcarrier demapping, the channel variation occurring between the mobile station device is compensated and thereafter sent to a data demodulator 56.

This specification is based on Japanese patent application No. 2008-167956, filed on Jun. 26, 2008, which is expressly incorporated herein in its entirety.

INDUSTRIAL APPLICABILITY

The present invention can be applied to a closed-loop transmission power control method in an Rel-8 LTE uplink PUCCH.

The invention claimed is:

1. A transmission power control method comprising:
receiving a hopped signal of one of a plurality of frequency bands from a terminal per a predetermined unit of time;
individually measuring a quality of the signal received from said terminal at said unit of time per said frequency band at which said signal is hopped, and determining the quality of the measurement signal per said frequency band based on whether the measurement signal that is the object of measurement and an adjacent signal that is timewise either before or after the measurement signal, are hopped within the same frequency band or between different frequency bands;
individually generating, at each said frequency band, transmission power control information that indicates the amount of uplink transmission power that should vary in said terminal in accordance with a difference in the quality of the measurement signal and a target quality per said frequency band, respectively; and
transmitting said transmission power control information, which is individually generated per said frequency band, to said terminal.

2. The transmission power control method according to claim 1, wherein
in the case where the measurement signal that is the object of measurement and an adjacent signal that is timewise either before or after the measurement signal are hopped between different frequency bands, the transmission power control information that indicates the amount of uplink transmission power that should vary in said terminal is generated by the difference in the quality between the measurement signal only and the target quality.

3. The transmission power control method according to claim 1, wherein
in the case where the measurement signal that is the object of measurement and an adjacent signal that is timewise either before or after the measurement signal are hopped within the same frequency band, the transmission power control information that indicates the amount of uplink transmission power that should vary in said terminal is generated by the difference between the time average of the measured quality and the target quality; and wherein
in the case where the measurement signal that is the object of measurement and an adjacent signal that is timewise either before or after the measurement signal are hopped between different frequency bands, the transmission power control information is generated based on only using the measurement signal.

4. A transmission power control method comprising:
receiving transmission power control information, which indicates the amount of uplink transmission power that should vary per hopped frequency band, from a base station apparatus, the base station apparatus being configured to determine the quality of the measurement signal per said frequency band based on whether the measurement signal that is the object of measurement and an adjacent signal that is timewise either before or after the measurement signal, are hopped within the same frequency band or between different frequency bands; and varying, per frequency band, the transmission power of the signals that are hopped at each frequency band in accordance with the received transmission power control information.

5. A base station apparatus comprising:

a receiver which receives a hopped signal of one of a plurality of frequency bands from a terminal per a predetermined unit of time;

a measuring unit which individually measures a quality of the signal received from said terminal at said unit of time per said frequency band at which said signal is hopped, and which determines the quality of the measurement signal per said frequency band based on whether the measurement signal that is the object of measurement and an adjacent signal that is timewise either before or after the measurement signal, are hopped within the same frequency band or between different frequency bands;

a generator which individually generates, at each said frequency band, transmission power control information that indicates the amount of uplink transmission power that should vary in said terminal in accordance with a difference in the quality of the measurement signal and a target quality per said frequency band, respectively; and a transmitter which transmits said transmission power control information, which is individually generated per said frequency band, to said terminal.

6. The base station apparatus according to claim 5, wherein in the case where the measurement signal, which is the object of measurement via said measuring unit, and an adjacent signal that is timewise either before or after the measurement signal are hopped between different frequency bands, said generator generates the transmission power control information that indicates the amount of uplink transmission power that should vary in said terminal by the difference in the quality between the measurement signal only and the target quality.

7. The base station apparatus according to claim 5, wherein in the case where the measurement signal that is the object of measurement and an adjacent signal that is timewise either before or after the measurement signal are hopped within the same frequency band, said generator generates the transmission power control information that indicates the amount of uplink transmission power that should vary in said terminal by the difference between the time average of the measured quality and the target quality; and wherein in the case where the measurement signal that is the object of measurement and an adjacent signal that is timewise either before or after the measurement signal are hopped between different frequency bands, said generator generates the transmission power control information based on only using the measurement signal.

8. A terminal comprising:

a receiver which receives transmission power control information, which indicates the amount of uplink transmission power that should vary per hopped frequency band, from a base station apparatus, the base station apparatus being configured to determine the quality of the measurement signal per said frequency band based on whether the measurement signal that is the object of measurement and an adjacent final that is timewise either before or after the measurement signal, are hopped within the same frequency band or between different frequency bands;

a frequency hopping unit which hops signals in a plurality of frequency bands; and a transmission power controller which varies, per frequency band, the transmission power of the signals that are hopped by said frequency hopping unit using the transmission power control information received by said receiver.

* * * * *